Oct. 4, 1932.    W. A. DUERR    1,880,907
PNEUMATIC SEPARATOR
Filed May 7, 1929
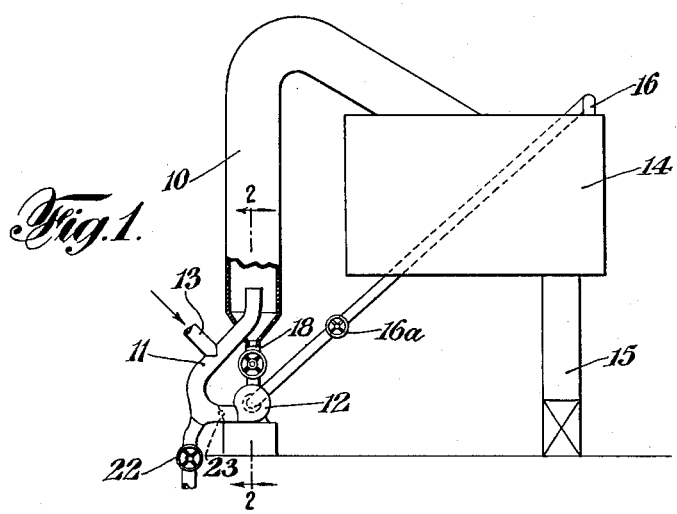
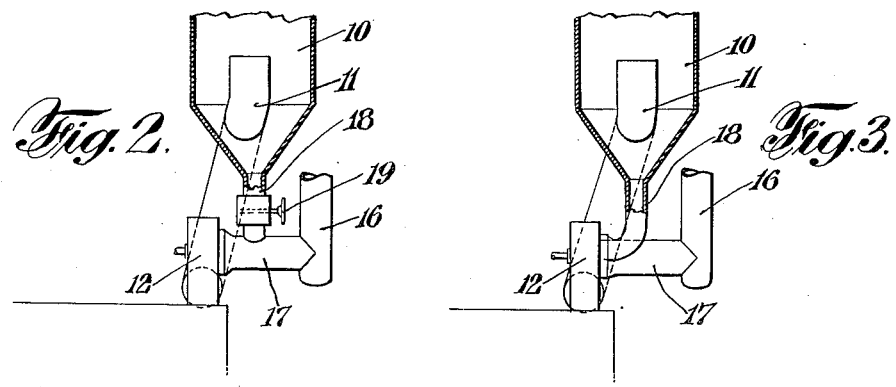
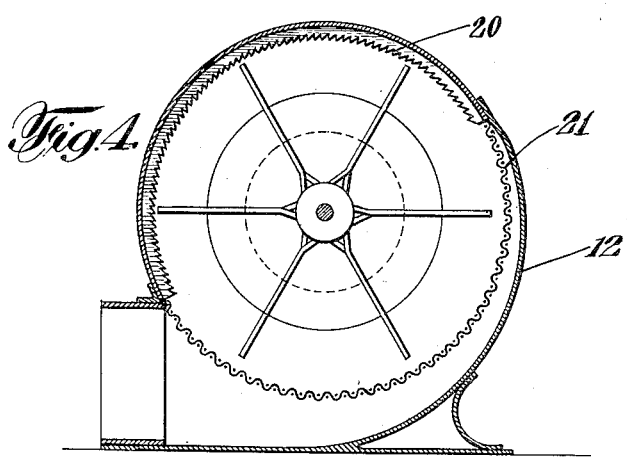
INVENTOR
Winslow A. Duerr
BY
Kenyon & Kenyon
ATTORNEYS Patented Oct. 4, 1932

1,880,907

UNITED STATES PATENT OFFICE

WINSLOW A. DUERR, OF BRECKENRIDGE, TEXAS, ASSIGNOR TO CABOT CO., OF BOSTON, MASSACHUSETTS, A CORPORATION OF MASSACHUSETTS

PNEUMATIC SEPARATOR

Application filed May 7, 1929. Serial No. 361,046.

This invention relates to pneumatic separators and more particularly to a device of this character for separating carbon black or similar light product from grit or the like produced in the combustion processes by which the carbon black is precipitated.

An object of this invention is an improved and efficient device of this character which is of simple construction and inexpensive to manufacture.

One embodiment of the invention comprises a tower into the bottom of which a conduit leads from the outlet of a blower. Means are provided for feeding into this conduit the grit and carbon black to be separated which is then blown into the separating tower. The heavier particles settle to the bottom of the tower, while the carbon black is carried by the air current into a closed settling hopper. An air return conduit leads from the hopper to the inlet of the blower and the grit or heavy particles collecting in the bottom of the separating tower are discharged into the blower housing, preferably through the return air pipe. The blower housing is provided with a corrugated peripheral plate which cooperates with the blades of the blower to break up the larger particles of grit. The breaking up of the grit releases carbon black contained therein which is returned to the separating chamber, while the particles of grit are removed from the apparatus.

Other objects, novel features and advantages of this invention will be apparent from the following specification and accompanying drawing, wherein:

Fig. 1 is a side elevation partially broken away of an apparatus embodying the invention.

Fig. 2 is an enlarged section taken substantially on the line 2—2 of Fig. 1.

Fig. 3 is a view similar to Fig. 2 of a slightly modified form, and

Fig. 4 is a section through the blower.

The separating chamber or tower 10 is provided with a conduit 11 having one end projecting into the tower a short distance and the other end communicating with the outlet of a rotary pump or blower 12. A pipe 13 leads into the conduit 11 for the purpose of supplying to the conduit the grit and dust to be separated. At its upper end the separating tower 10 communicates with a closed settling hopper 14 which communicates with a packer 15. An air return pipe 16 leads from the top of the settling hopper 14 to the inlet of the pump or blower 12 and is provided with a valve or damper 16ª. The lower end of the separating tower 10 is tapered and communicates with a discharge spout 18 which leads either to the air return pipe 17 as shown in Fig. 2 or to the blower 12 at a point about half way between the center and the periphery of the blower as shown in Fig. 3. Where the spout 18 leads into the pipe 17 a rotary lock valve 19 is provided to prevent flow of any considerable quantity of air from the separating tower into the fan. With the spout 18 leading to the blower as in Fig. 3, this valve is not necessary for at this point, there is very little, if any, suction produced by the fan.

The blower is provided at its inner periphery for approximately 180° with a corrugated plate 20 and for the remaining 180° with a screen 21. Particles of grit discharged into the blower from the separating tower which are too large to pass through the screen 21, are broken up by the fan blades and corrugated plate until they are small enough to pass through this screen. The breaking up of these particles releases some carbon black or dust, which is returned to the separating tower through the conduit 11. This conduit is provided with a sharp bend as shown in Fig. 1, and the larger particles escaping through the screen 21 will not make the turn at this point, but will drop into the discharge conduit 22 provided at the bend for this purpose. The light particles, however, will make the bend and be carried on into the separating tower.

In the operation of this apparatus, grit and carbon black or other dust is introduced through the feed pipe 13 into the conduit 11 in which it is carried by the current of air produced in the fan 12 and discharged into the separating tower 10, and the mixture of grit and carbon black is forcibly discharged upwardly into the separating tower 10. The velocity of the air current is materially decreased in the separating tower with the result that the heavier particles or grit drop by gravity into the bottom of the tower, while the light particles are carried over into the hopper 14, where, because of the stagnant condition of the air they settle to the bottom. Air is returned from the hopper 14 to the fan 12 and recirculates the heavier particles or grit which discharge from the separating tower 10 into the blower 12 where they are broken up by the fan blades and corrugated plate 20 previously described. The rotary lock valve 19 need not be air-tight since recirculation of air through it is not harmful except to reduce the efficiency of the blower. The damper 16a provides means by which the total amount of air circulated can be controlled. With the arrangement of spout 18 shown in Fig. 3, a damper 23 should be provided in the conduit 11 to control the pressure drop between the blower and the separating chamber and hence the amount of air which is re-circulated with the returning grit.

In the apparatus disclosed, I have provided a means whereby continuous separation of gritty substances may be carried on. The contaminated mixture as it comes from the combustion chambers of the carbon black manufacturing process is continuously fed into a closed cyclic system through the conduit 13. This closed cyclic system may be regarded as originating in the blower 12, passing through the conduit 11 into the separating tower 10, thence to the settling hopper 14 and back through the conduit 16 to the intake side of the blower 12. A current of air circulates through this system in the direction indicated. Cleaned and uncontaminated carbon black, percipitated in the hopper 14, may be continuously or intermittently removed from this closed system through the packer 15. The contaminating grit particles, collected in the discharge conduit 22, may be continuously or intermittently removed from the system at that point. It should be noted that the heavy particles which precipitate downwardly in the tower 10 against the rising current of air therein are short-circuited through the conduit 18 back to the blower, thus returning to the closed circuit without passage through the hopper 14 and conduit 16. To this extent one portion of the closed circuit comprises two paths in parallel.

It is a particular advantage of the present invention that, in addition to pulverization, the apparatus is adapted to effect a separation of the undesired contaminating particles, and a continuous elimination thereof from the system. In this way my apparatus is enabled to operate upon non-homogeneous material and to become an effective separator of mixed powdery materials which require pulverization in order to effect complete separation. Thus, when employed in the separation of grit particles from carbon black freshly manufactured, it is often found that large grit particles will contain pockets of pure carbon black material which it is desirable to release therefrom by pulverization of the grit particles; and at the same time large numbers of pure carbon black particles may be agglomerated together in the form of flakes. My apparatus is peculiarly adapted to the separation of powdery mixed solids presenting such a problem because it pulverizes the particles which are sufficiently large to settle downwardly in the tower 10, and eliminates grit particles, from which pure carbon black has been released by this pulverization, from the system without again introducing them into the separating tower. Another advantage is that fresh incoming stock passes at once to the separating tower without passing through the blower. Thus the blower need be only of such size or capacity as is sufficient to handle the volume of large particles which falls down in the tower.

It will be understood that the conduit for feeding fresh contaminated stock to the cyclic system may be located at the inlet side of the blower, or at the top of the separating tower, or in the duct 16 or elsewhere, without departing from my invention. I prefer, however, to locate it at the point shown in Fig. 1.

It is of course understood that various modifications may be made in the apparatus above described, without in any way departing from the spirit of the invention as defined in the appended claims.

I claim:

1. In a closed cyclic system for the continuous separation of solid particles which includes a gravity separating tower, the combination of a propelling and pulverizing device, means to transmit particles separating downwardly in said tower to said device, a discharge conduit leading from said device to said tower, a sharp bend in said conduit and a trap associated therewith and adapted to catch and eliminate from the system particles of relatively greater mass contained in the suspended mixture passing through said conduit, and means for the introduction into said system of fresh supplies of solid particles to be separated.

2. In a closed cyclic system for the continuous separation of solid particles which includes a gravity separating tower, the combination of a propelling and pulverizing device, means to transmit particles separating downwardly in said tower to said device, a discharge conduit leading from said device to said tower, a sharp bend in said conduit and a trap associated therewith and adapted to catch and eliminate from the system particles of relatively greater mass contained in the suspended mixture passing through said conduit, and means along a further traverse of said conduit for the introduction into said system of fresh supplies of solid particles to be separated.

3. In a closed cyclic system for the continuous separation of solid particles which includes a gravity separating tower, the combination of a propelling and pulverizing device having a screen, means to transmit particles separately downwardly in said tower to said device, a discharge conduit leading from said device to said tower, a sharp bend in said conduit and a trap associated therewith and adapted to catch and eliminate from the system particles of relatively greater mass contained in the suspended mixture passing through said conduit, and means for the introduction into said system of fresh supplies of solid particles to be separated.

4. In a closed cyclic system for the continuous separation of solid particles which includes a gravity separating tower, a settling chamber and an air return duct, means for propelling in suspension in a current of air through a conduit the particles which have separated downwardly in said tower, a sharp bend in said conduit adapted to cause the separation from said suspension of particles of relatively greater mass, a trap associated with said bend and adapted to catch and eliminate the said particles from the system, means along a further traverse of said conduit for the introduction into said system of fresh supplies of solid particles to be separated, and means for directing the balance of said suspension into said tower.

In testimony whereof, I have signed my name to this specification.

WINSLOW A. DUERR.